United States Patent [19]
Gluskin et al.

[11] 3,855,621
[45] Dec. 17, 1974

[54] PNEUMATIC NO-CONTACT DOCUMENT READ/WRITE STATION

[75] Inventors: Richard S. Gluskin, Wayne; Eugene B. Barcaro, Norristown; Edwin R. Phillips, Rosemont; Arnold Schonfeld, Norristown; Joseph Van Reymersdal, Fairless Hills, all of Pa.

[73] Assignee: Sperry Rand Corporation, New York, N.Y.

[22] Filed: Dec. 22, 1972

[21] Appl. No.: 317,814

[52] U.S. Cl. .................................. 360/102, 271/74
[51] Int. Cl. ............................................ G11b 5/60
[58] Field of Search........ 340/174.1 E; 179/100.2 P, 179/100.2 PM; 226/95, 108, 174, 97; 360/102

[56] References Cited

UNITED STATES PATENTS

| | | | |
|---|---|---|---|
| 3,465,320 | 9/1969 | Weidenhammer | 340/174.1 E |
| 3,609,724 | 9/1971 | Allison | 340/174.1 E |
| 3,623,042 | 11/1971 | Woehler | 340/174.1 E |
| 3,688,956 | 9/1972 | Kjos | 340/174.1 E |
| 3,725,606 | 4/1973 | Thompson | 340/174.1 E |
| 3,726,519 | 4/1973 | Bukovich | 340/174.1 E |
| 3,747,080 | 7/1973 | Taylor | 340/174.1 E |

*Primary Examiner*—Vincent P. Canney
*Attorney, Agent, or Firm*—Rene A. Kuypers

[57] ABSTRACT

There is disclosed herein a pneumatic read/write station which achieves very high speed and high density recording and reading on a document having a magnetic medium. The read/write station is characterized by the ability of the document to be transported on a rotating drum past the read/write head numerous times at a constant high speed and without any contact. The close proximity of the document to the head required for a read/write cycle is achieved by raising the document off the rotating drum toward the head after which it is lowered back to the drum, by controlling the amount of air bearing between the head and the document, and by utilizing a document whose length is longer than the drum circumference.

18 Claims, 8 Drawing Figures

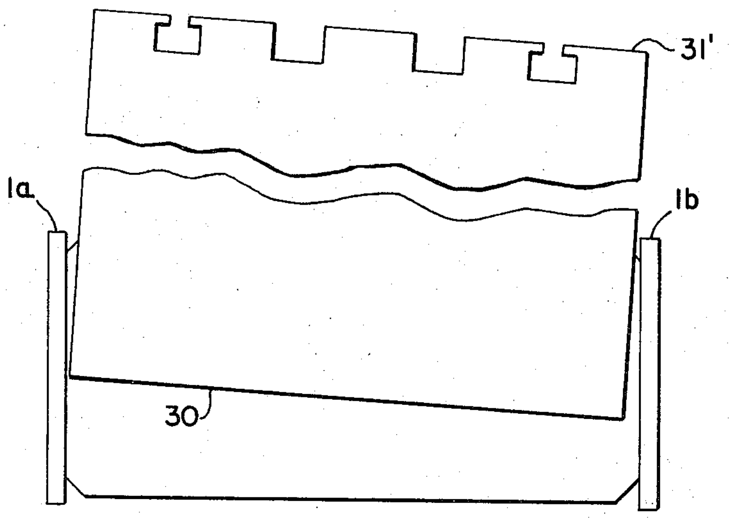
Fig. 2a
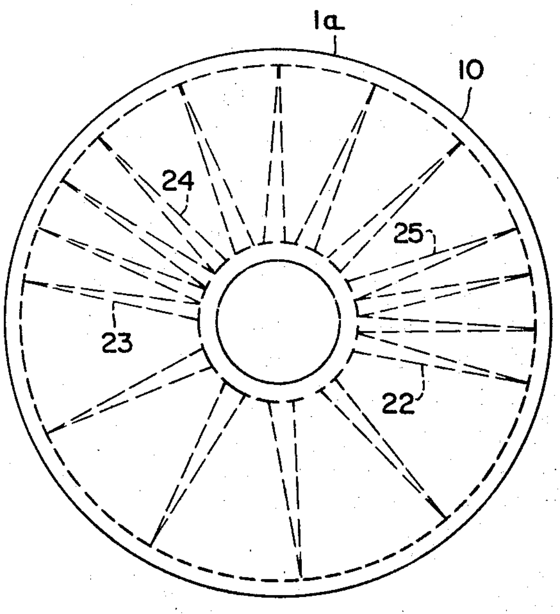
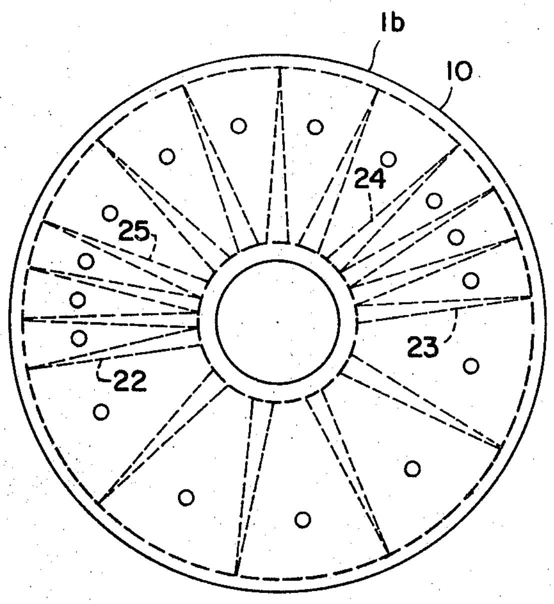
Fig. 5 Fig. 5a

PNEUMATIC NO-CONTACT DOCUMENT READ/WRITE STATION

BACKGROUND OF THE INVENTION

1. Field of the Invention

The instant invention relates to a pneumatic read/-write arrangement for recording and reading information on a magnetic medium.

2. Description of the Prior Art

In known prior art devices there are some well recognized shortcomings. One of the salient shortcomings of the known prior art systems is the relatively short life of the card member which is rotated on the capstan. This short card life results from the physical contact of the card as it rotates on the capstan with the read-write head. The card is kept in contact with the surface of the heads by a vacuum acting through ports in the head. The lateral movement of the head across the card member for track positioning purposes also had a deleterious effect on card life. It is with these shortcomings in mind that the instant invention has been designed.

Prior art of interest and which are made of record are U.S. Pats. Nos. 2,905,768, 3,170,045, 3,688,956, "IBM 2321 Data Cell Drive" (Proceedings, Spring Joint Computer Conference, 1966), and High-Performance NCR CRAM by Gerlach, Nov. 1966, Publication 4775.

SUMMARY OF THE INVENTION

The present invention comprises a pneumatic data processing read/write station which is capable of transporting a document numerous times past the read/-record head without any contact.

The main parts of the pneumatic read/write station are a rotating drum assembly which has four stationary vanes located inside the drum in order to form four main stationary chambers. The main chambers are divided into further smaller chambers by additional vanes. Numerous holes are formed on the periphery of the drum and extend into the various chambers. Therefore, the outside surface of the rotating drum cooperates with the stationary chambers through the perforations in the drum surface so that positive and negative forces may act on the document.

Two of the main chambers in the drum are maintained at a negative pressure and the third chamber in the vicinity of the read/write heads is maintained at a low positive pressure. The fourth chamber oriented almost directly opposite the low positive pressure chamber is a switchable chamber and is designed so that it can be switched from a negative to a low positive pressure and back to a negative pressure.

The magnetic head which is part of the pneumatic read/write station is oriented near the periphery of the rotating drum and is held stationary. Two stationary chambers which are actually made integral with the head assembly are juxtaposed to the recording heads wherein the first chamber is located on the upstream side and is connected to a vacuum source, whereas the second chamber is oriented on the downstream side and is pressurized at a low positive pressure. The head includes a plurality of closely spaced circumferential slots at the end of which are respective ports and which in turn are coupled back to the upstream vacuum source.

When a document having a magnetic coating is readied for a read/write cycle, it is placed on the rotating drum and thereafter, it is held in position by the vacuum in one of the stationary chambers inside the rotating drum and near the entrance shoe. As the drum rotates the document toward the head, the leading edge eventually reaches the low positive pressure chamber inside the drum almost directly opposite the head. This positive force causes the leading edge of the recording medium to peel off the drum. The low pressure air emanating through the perforations of the rotating drum therefore causes the magnetic medium to pass in close proximity to the recording heads. The upstream stationary vacuum chamber on the head assembly allows the document to pass within several microinches of the read/write heads by reducing the air film between the card and the head. The slots in the head which are coupled into the vacuum chamber in the head assembly provide a control means for fine positioning the document with respect to the head but without producing contact.

The document is forced away from the head by the low pressure in the downstream or pressurized chamber. The air pressure in the downstream chamber in conjunction with the vacuum in the next adjacent stationary chamber within the drum causes the leading edge of the document to return to the rotating drum. The above-described peeling off and returning of the flexible document provides a bubble shape configuration in the vicinity of the read/write head.

After the document has almost come full circle, it can either remain on the drum and repeat the previously described read/write cycle or it can be removed from the drum. If the document is to be removed from the drum, the switchable chamber inside of the drum is changed from a vacuum to either ambient pressure or a low positive pressure. Without the vacuum to hold the card against the drum, the leading edge of the document will peel away when it reaches the switchable chamber. This action enables the document to exit from the read/write station.

In the event that it is decided that the document is to repeat a read/write cycle, the switchable chamber retains its vacuum so that the document continues to rotate on the drum and therefore is again transported past the read/write head. This repetitive action can occur innumerable times in the instant invention in view of the non-contact nature of the document with respect to the head.

It should be noted here that the document's length is such that it is longer than the circumference of the drum. Consequently, when the document completely surrounds the drum there is an overlap of the document's leading edge by its trailing edge. This arrangement prevents wear on the document and particularly on the leading edge.

BRIEF DESCRIPTION OF THE DRAWINGS

FIG. 2*a* depicts the skewing of the longitudinal axis of the document with respect to the drum axis. Also depicted is the binary end-coding on the trailing edge of the document;

FIG. 5 shows the sealing of one end of the drum and FIG. 5*a* depicts the flow resistive orifice plate connected to other end thereof.

DESCRIPTION OF THE PREFERRED EMBODIMENT

Figure 1:
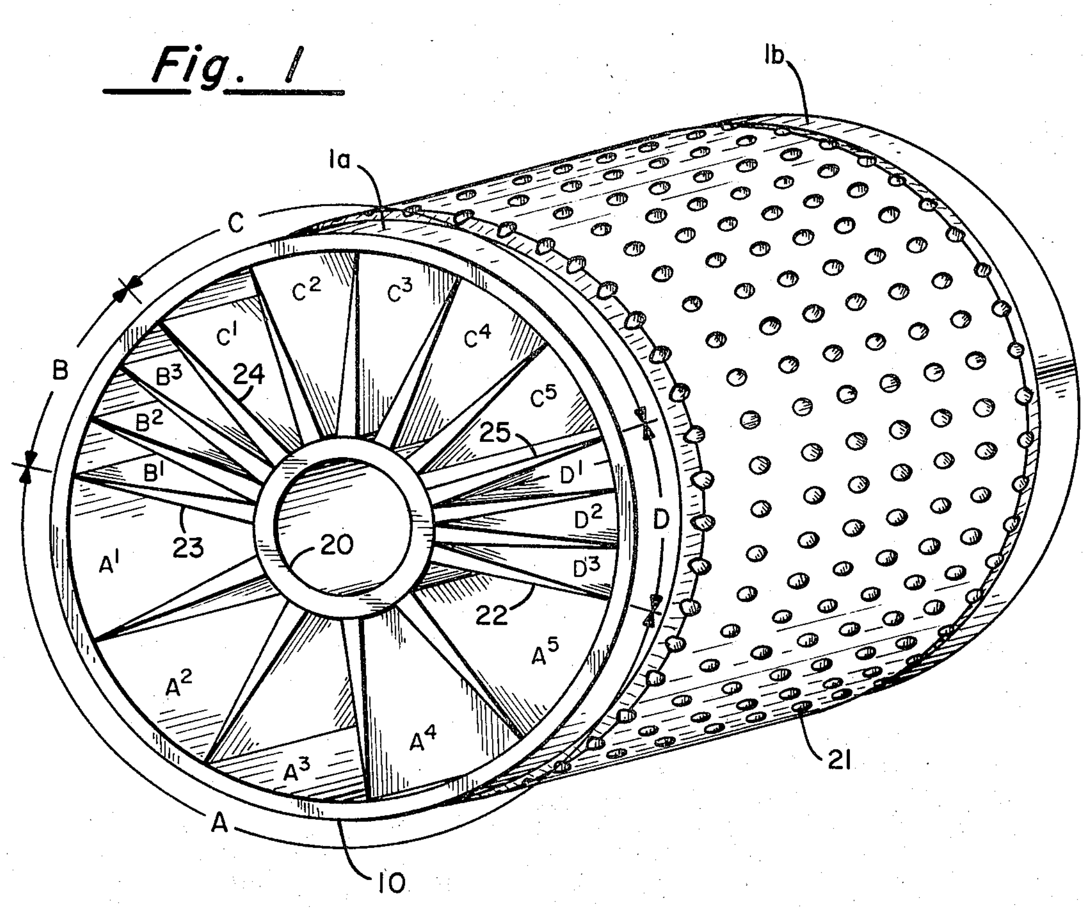
FIG. 1 depicts a view of the drum arrangement utilizing the instant no-contact document read/write station.

Referring now in greater detail to FIG. 1, there is depicted the rotating drum assembly 10 which is utilized in the no-contact document read/write station. Major stationary chambers A, B, C and D are formed inside the rotating drum 10 by means of the stationary vanes 22, 23, 24 and 25. Minor chambers $A^1$, $A^2$, $A^3$, $A^4$, $A^5$, $B^1$, $B^2$, $B^3$, $C^1$, $C^2$, $C^3$, $C^4$, $C^5$, $D^1$, $D^2$, $D^3$, are formed by similar stationary vanes (not numbered). The major stationary vanes 22, 23, 24 and 25 including the non-numbered minor ones are permanently positioned on the hub 20 and extend up to the rotating drum 10 with approximately a 1 or 2 mil clearance. The major chambers A, B, C and D as well as the minor chambers are maintained at various pressures with minimum air leakage. Major chambers A and C and their included minor chambers are maintained at a negative pressure whereas Chamber B and its included minor chambers are maintained at a low positive pressure. Chamber D and its included minor chambers are maintained normally at a negative pressure but may be switched to a positive pressure and then back to a negative pressure. The number of minor chambers within a major chamber can be varied in order to obtain a certain performance level and accordingly the number shown can be varied at will. The operation of these major and minor chambers in conjunction with document 35 will be discussed in greater detail hereinafter. Located on the periphery of the drum 10 are a plurality of holes 21 which extend into the various chambers and therefore permit the outside of the drum to communicate with the various pressures inside thereof.

As stated above, the major stationary vanes 22, 23, 24 and 25 and the non-numbered minor ones are maintained on the hub 20 while the drum 10 is rotated. To assure non-movement of the stationary vanes and hub 20, the latter may be fixedly held in position by attachment to the chassis (not shown). Drum 10 is rotated by extending an axle (not shown) through the hub 20 and connecting the axle to the drum 10 by a back plate at its end point. The axle means extending through the hub 20 is connected to a primary mover or a motor (not shown) and rotated at extremely high speed. In the instant embodiment, the drum is rotated at a speed of approximately 1,400 R.P.M.

The drum 10 includes two flat rim members **1*a* and 1*b* which are not perforated. The end portions of the perforated drum between the rims 1*a* and 1*b* are chamfered so that an edge is formed against the inside portion of the rims 1*a* and 1*b***. The purpose of this arrangement will be discussed in a later paragraph.

Figure 2:
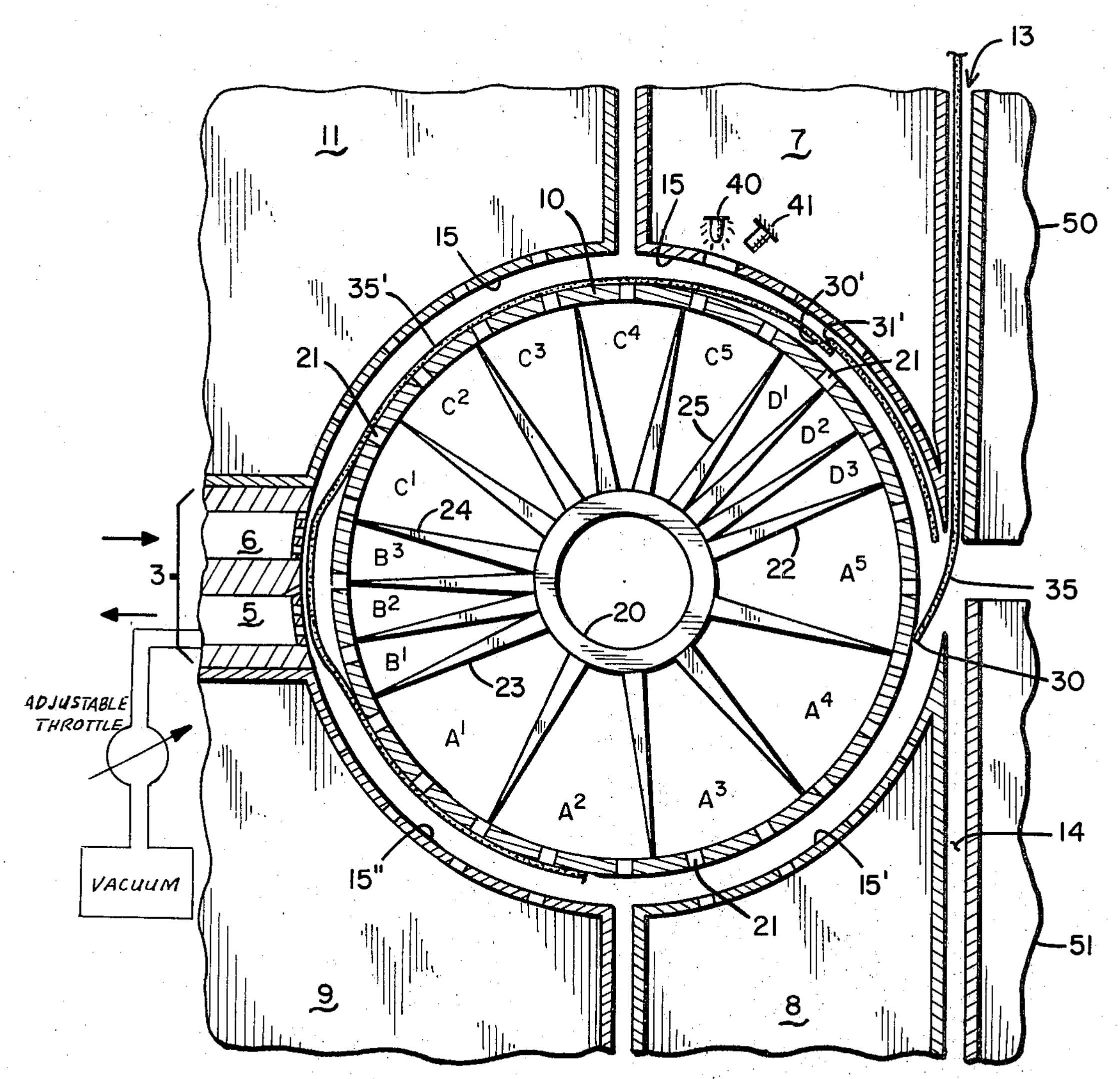
FIG. 2 represents a sectional view through the drum and includes the additional environment and structure surrounding the drum.

Referring now to FIG. 2, there is depicted a sectional view of the rotating drum 10 together with the major stationary vanes 22, 23, 24 and 25 and the non-numbered minor ones positioned on the hub 20. The axle extending through the hub 20 and the attaching rib means are not shown for purposes of clarity. Surrounding the rotating drum 10 are the shroud chambers 9 and 11 and the shoe chambers 7 and 8. The respective shroud and shoe chambers are maintained throughout the operation of the rotating drum 10 at a low positive pressure. Also located near the periphery of the rotating drum 10 is the read/write head carcass 3. As is well known, the read/write carcass 3 is connected to appropriate circuitry for reading and recording information on a magnetic medium.

Referring now to FIGS. **4*a* and 4*b* the carcass is shown in greater detail. Thus, the concave area is the surface which is juxtaposed to the drum 10. The carcass 3 is arranged with a plurality of ports 60 and 66 and is arranged so that the two rows of ports 60 are oriented on the upstream side, and the three rows of ports 66 are oriented on the downstream side in the read/write station assuming a clockwise rotation of the drum in FIG. 2 and a counterclockwise rotation as viewed from the right-hand end of FIG. 4*a*. The ports 60 are connected to the vacuum chamber 5 whereas the ports 66 are connected to the positive pressure chamber 6.**

Intermediate the ports 60 and 66 are the slots 62 which are formed several mils below the surface. Each slot 61 is coupled by one port into the vacuum chamber 5. Sixteen read/write heads 64 are arranged between the slots 62 such that there are 4 slots between consecutive heads. The head 64 is comprised of a write head 70 and a read head 71. The bottom box-like portion 2 of the carcass assembly 3 encloses some of the electronics required for the read/write operation.

Returning again to FIG. 2, the document 35 is shown for purposes of explanation in two different locations in the read/write station and will be identified at these locations by the numerals 35 and 35'. The operation of the no-contact read/write station will be discussed with respect to the two positions of the document. It should be understood that only portions of the document 35 are depicted on the drum and it will be recalled that the circumference of the drum 10 is less than the total length of the document. The document 35 utilized in the instant invention is end-coded in the manner of U.S. Pat. No. 3,105,593 and as shown in FIG. **2*a*. In the particular embodiment, the end-coded portion of the document 35' is considered the trailing edge 31' whereas the non-coded end of the document is the leading edge 30' (see FIG. 2). In other words, the leading edge 30' is the first part of the document to contact the drum 10 and the end-coded trailing edge 31' is the last portion on the drum as the document 35 enters the read-write station from the entrance track 13.**

Figure 3:
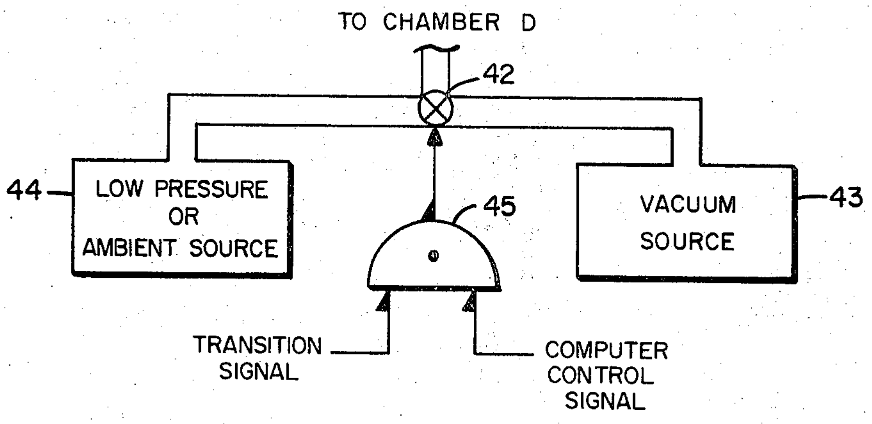
FIG. 3 shows an arrangement of altering the pressure of the stationary chamber within the rotating drum.

Associated with the read/write station is an arrangement for detecting the leading edge 30' of the document 35'. The arrangement for detecting the leading edge 30' comprises well known circuitry which includes an optical sensor light 40 and a transducer detector 41 which detects the rays or absence of rays reflected from the highly polished drum surface. The document has a relatively non-reflective surface, so that when it covers the point of light incidence on the drum, a reflected light signal will not be received by transducer 41. The output of transducer 41 is connected as one of the inputs to AND gate 45 as shown in FIG. 3.

As above mentioned, the stationary chamber D may be switched from a vacuum to a low positive or ambient pressure and back to a vacuum. A basic switching arrangement for chamber D is shown in FIG. 3. In FIG. 3 there is shown an AND gate 45 whose output terminal is connected to a solenoid operated three-way valve 42. Coupled into the valve 42 is the negative pressure source 43 and the low positive pressure or ambient source 44. The output of the valve is connected into Chamber D (FIG. 2). In the unenergized state, the solenoid operated three-way valve is such that the vacuum source 43 is connected into the major chamber D including the minor chambers $D^1$–$D^3$.

Referring again to FIG. 2 for the operation, the document 35 enters the read/write station via the entrance track 13 located between shoe chamber 7 and the adjacent chamber 50. Both chambers 7 and 50 are pressurized at a low positive pressure and provide two air bearing surfaces via the slots 21 so that no contact is made between the document 35 and the sides of the chamber. In an actual embodiment, the document 35 is iron oxide covered Mylar which is approximately 21 inches long, 5.2 inches wide and .005 inches thick wherein approximately 20 inches of the length dimension is utilized for actual recording purposes. For illustrative purposes only a portion of the document 35 is shown in FIG. 2 entering the entrance track 13.

As the leading edge 30 of the document 35 falls by gravity or is driven into the vicinity of the rotating drum 10, it is brought into proximity of the stationary vacuum chamber area A (i.e., between vanes 22 and 23). Since the stationary chamber A and, in particular, minor chamber $A^5$ is at a negative pressure or vacuum, the leading edge 30 of the document 35 will be drawn and held to the surface of the rotating drum 10. It should be noted hereat that chamber A is divided into smaller chambers $A^1$–$A^5$ to provide superior attachment characteristics of the document to the drum 10. Therefore, as soon as document 35 begins to seal off minor chamber $A^5$ and eventually completely seals it off, a strong attaching force is produced which provides a positive initial attachment. As the document continues to rotate, similar positive attachment points for the document are produced by chambers $A^4$, $A^3$, $A^2$ and $A^1$. The strong attaching force produced by the minor chambers $A^1$–$A^5$ is to be contrasted with the relatively weak attaching force of the major chamber A alone (without intermediate vanes) which cannot be sealed off by the document until the document 35 reaches the stationary vane 23.

In an actual embodiment, the vacuum flow to each minor drum chamber is controlled by respective small orifices (see FIG. 5*b*) acting to limit the flow from each chamber into the vacuum source when the document is not present. These orifices afford some measure of isolation from minor chamber to minor chamber as seen by the vacuum source since the small orifices act like high resistances in its supply line. By limiting the flow, the resistive orifices allow the vacuum source to maintain a constant vacuum level whether or not a document is on the drum. In this manner, a minor chamber can reach full vacuum immediately, as soon as it is covered by the document, and thereby attach the document tightly to that section of the drum. If the individual orifices leading into respective chambers were omitted and one large orifice were provided to communicate with all the minor chambers, the vacuum source would not be able to maintain a constant level, and a build up of full vacuum in any of the minor chambers would not be possible until the drum was almost entirely covered by the document.

When the leading edge 30 becomes attached to the drum, the document 35 will be accelerated to the velocity of the drum surface or approximately 500 inches/sec. The speed of the document 35 in the entrance slot 13 is approximately 150 inches per second. Accordingly, the leading edge 30 will follow the clockwise rotation of the rotating drum 10 as more of the flexible document 35 is pulled around. The shoe chamber 8, which is also at a low positive pressure, provides an air bearing along the inside surface 15′ so as to prevent the document 35 from contacting the shroud surface.

Referring again to FIG. 1, the perforated drum 10 is shown to be chamferred at either end. Alignment takes place against only one chamferred edge or drum flange by slightly skewing the longitudinal axis of the document transport entrance with respect to the drum so that the document's edge is brought hard against the flange (see FIG. 2*a*). This accurately positions the documents on the drum. As is well known, accurate alignment is important in magnetic reading and recording so that the desired read/write head (see FIG. 4) is positioned with respect to the correct track on the document 35.

Accordingly, chamferring the drum accomplishes the following results. As the vacuum attempts to pull the card into the chamferred section, the document 35 is unable to wrap around the drum 10 in three dimensions and consequently assumes a corrugated effect at the flange. This distortion increases the stiffness of the document 35 as it is forced against the drum flange. The effective height of the flange is increased because of the chamfer.

Another benefit of chamferring the drum near the rims 1a and 1b results from the fact that the drum vacuum attempts to pull the card into the chamferred edge thereby producing a moment in the card edge. This moment deflects the edge of the document 35 away from the magnetic head 3. Normally, the edge of the document 35 flies at or near contact, producing edge surface wear. Therefore, chamferring pulls the edge away and prevents card to head contact.

It should be noted hereat that the document 35 is shown in FIG. 2 at another rotational position and for ease of understanding is now identified as document 35′ and its leading edge is 30′. It should also be recalled hereat that document 35′ is longer than the circumference of the drum 10 so that there is overlap by the endcoded trailing edge 31′ of the leading edge 30′. In a manner previously described, the shroud chamber 9 which is pressurized at a low pressure also provides an air bearing on the surface 15″ so that there is no contact with the shroud surface.

When the leading edge 30′ of the document 35′ reaches the stationary chamber B it begins to peel off the rotating drum 10. The leading edge 30′ is peeled off the rotating drum 10 by the positive pneumatic force acting through the perforations 21 of the stationary chamber B and in particular the chamber $B^1$. Each chamber $B^1$–$B^3$ provides a positive uplifting force as soon as document 35′ passes the section openings. As the document 35′ is peeled off the drum beginning at chamber $B^1$ it begins to move in a direction of the read/write head 3. As the document 35′ progresses toward the head, the air between the upper bearing surface and document is squeezed due to the combination of forces from the air pressure in chambers $B^1$–$B^3$ and the centrifugal force pushing the document outward. Some of the air in this squeezed film flows in the direction of the document motion toward the recording head and when the leading edge 30' reaches the head 3, most of the air between the card and the bearing surface is pulled away by the vacuum source 5. Referring again to FIG. 4, the holes 60 are shown leading into the chamber 5.

As the document 35' continues to move in a clockwise direction, it continues to move in close proximity to read/write heads 3 and a very thin boundry layer of air is carried along with the document to the recording head surface. This boundary layer of air provides a protective air bearing between the recording head and the document and prevents wear on either surface. Additional control of the boundry layer of air is provided by the slots 62 (see FIG. 4) which trap air and is withdrawn by the vacuum chamber 5 via the holes 61. Bearing air films on the order of 50–100 microinches are attainable using the head and chamber configuration above described. In another embodiment of the invention the vacuum source 5 may be replaced by a chamber which merely vents to atmosphere. some instances, the air entrapped by the slots 62 and eliminated by the ports 61 obviates the necessity for including the ports 60.

After the leading edge 35' passes the read/write head 3 it is again forced down on the rotating drum 10. This is accomplished by means of the pressurized chamber 6 located downstream from the head 3. The low pressurized air emanating from chamber 6 flows in a downward direction through the ports 21 causing the leading edge to be forced down against the surface of the drum 10. The leading edge 30' will then be pulled against the surface of the drum 10 by the vacuum in the stationary chamber C and in particular chamber C'. The document 35' will then continue to be rotated around the drum in a clockwise direction through consecutive attachment to chambers $C^2$–$C^5$. It should be noted hereafter that the document 35' assumes a bubble configuration near the read/write head 3 throughout the length of the document from the leading edge 30' until the trailing edge 31' is forced away from the drum at the beginning of chamber B'. It should also be readily apparent that the input and output arrows emanating from the head 3 comprise respectively the input and output signals applied or from the head 3 by appropriate circuitry (not shown) for a respective read or write cycle. It should also be observed that although the preferred embodiment of the instant invention contemplates a magnetic recording scheme, nevertheless other means, such as laser or photoelectric techniques could be accommodated. The flexible document 35' can be brought within 50–100 microinches within a very small tolerance band with relative ease and simplicity.

After completing a read/write cycle the document 35' continues to move in a clockwise direction around the stationary chamber C. It should be noted hereat that as the document 35' was rotated around the stationary chamber C it passed between the drum reflected signal from the optical sensor light 40 and the transducer 41. As soon as the leading edge 30' of the document 35' passes between the drum reflected signal and the transducer 41 the intensity of the reflected light is reduced therefrom so that the output voltage of the transducer 41 is altered from a H (high) to a L (low) level.

Figure 4B:
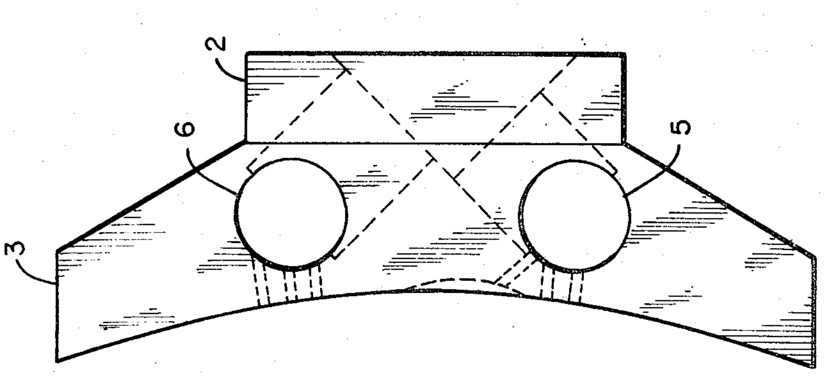
FIG. 4 consisting of FIGS. 4a and 4b shows a view of the read-write carcass utilized in the instant read/write station.
Figure 4A:
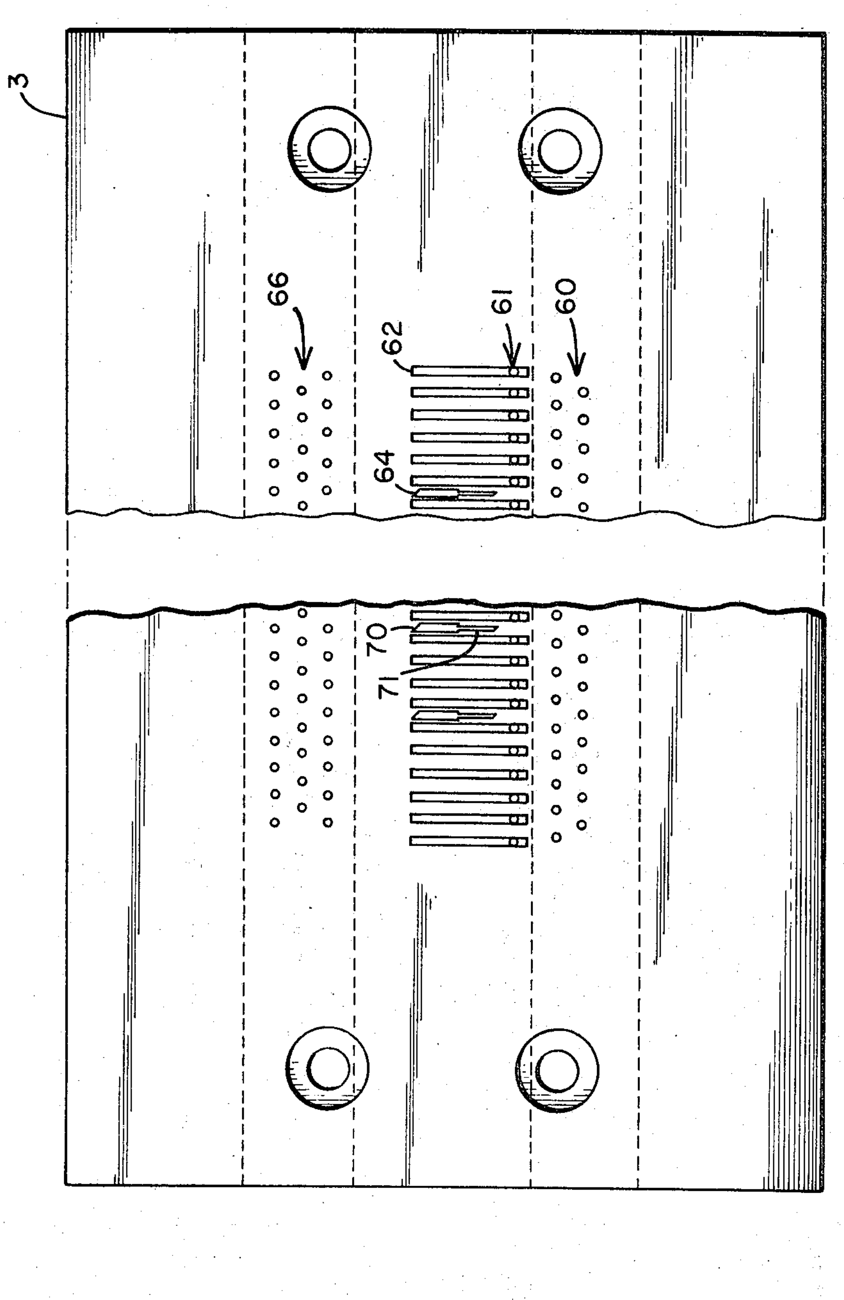

Let us assume therefore that the document 35' is to be removed from the rotating drum 10 after completion of a read or write cycle. As previously described the vacuum pump 43 is coupled into the stationary chamber D (FIG. 2) through the three way solenoid valve 42 when the latter is in its quiescent or unenergized state. An AND gate 45 shown in FIG. 4 is utilized to produce a release signal to activate or energize the solenoid for removing the document from the drum. The AND gate 45 operates such that only when both input signals are H, its output will go H.

The first input to the gate 45 is a control signal which is produced by the computer (not shown). Accordingly, for removal of the document this signal is made H. The second H input to the gate 45 results from the L to H transition signal produced by the transducer 41 when the document travels on the drum 10 for a second revolution and the leading edge has been overlapped by the trailing edge. As a consequence of this overlapping, there is no reflected light from the reflective surface of the drum 10 (i.e., the output of transducer 41 is L) until the light impinges on the drum through the endcoded slots which are not completely covered by the overlap. As soon as this document overlap is opposite the light source 40 a light transition occurs so that the output of transducer 41 changes from L to H. This signal transition is applied to a flip-flop device (not shown) to cause it to assume a set condition or a H state. This H signal is the second input applied to the AND gate 45 of FIG. 3. Therefore, the gate 45 is enabled and a release signal is produced at its output terminal. This signal is applied to additional drive and power circuitry (not shown) to energize the three-way valve solenoid, thereby closing-off the vaccum source 43 and allowing the low pressure source 44 to vent into chamber D.

Therefore, as soon as the leading edge 30' reaches chamber $D^1$ and in particular chamber D' it is peeled off the rotating drum 10 by the centrifugal force acting on the card in chamber D. This centrifugal force is normally counteracted by the vacuum in chamber D. Accordingly, as the rotating drum continues in a clockwise direction the leading edge 30' will be forced off the drum 10 and into the exit channel 14 as depicted in FIG. 2. As the document 35' enters the exit channel 14 an air bearing is again provided by the surfaces of chambers 8 and 51. After release, the flip-flop circuitry is reset by the computer so that it is ready to start another cycle of operation.

In order for the document 35' to remain on the drum 10 for additional revolutions, the solenoid valve 42 must remain in the unenergized state so that the vacuum pump 43 continues to be coupled into the major stationary chamber D. The solenoid valve 42 remains unenergized by not enabling the AND gate 45. This is accomplished by not applying a computer control signal or by keeping this signal L. Therefore, the output of gate 45 remains L and valve 42 is not activated.

As can be readily appreciated therefore, when the record member 35' reaches major chamber D and in particular minor chamber $D^1$ in its clockwise rotation it will continue to remain locked on the rotating drum 10 by the vacuum applied through the perforations.

From the above description it should be clear that after the document 35' passes the head 3 it can be removed from the drum 10 in the manner previously described or it can remain on the drum for additional revolutions.

It should be noted that although the document exit mode operation has been described with respect to an L to H transition signal, those skilled in the art will appreciate that this operation can be performed equally well with an H to L transition signal.

As was previously discussed, when the document is rotated past the head more than once, the end-coded trailing edge 31' has overlapped the leading edge 30' by approximately one/sixteen of an inch. However, the end-coded slots are long enough so that even with overlap the light from source 40 can be reflected through the slots from the drum surface to the transducer 41. This arrangement enables a light transition signal to be generated when passing the source 40.

Document overlap provides significant improvement over other known devices in that it prevents wear on the leading and trailing edges of the document. Thus, in the case where there is no overlap the leading portion of the document would be subject to a significant velocity pressure on its underside as it left the drum and approached the head. This pressure is caused by the reaction of the static ambient air and the rapidly moving document as its leading edge attempts to compress the air in front of it. This would cause the leading edge to press against the head, producing wear. The overlap prevents this compression effect by causing the ambient air to flow over the overlap instead of under the leading edge. Another advantage is that if overlap were not present the air bearing would dissipate at the separation between the leading edge and trailing edge and head contact would be prevalent. Still another advantage of overlap is that on the areas of the drum where vacuum is normally acting on the document, the overlap minimizes the open space between the vacuum chamber and the ambient air above the document. This restricts the flow of air into the vacuum chamber, which helps maintain a more constant vacuum level in the chambers. Consequently, all of the vacuum chambers are effectively sealed off when the document is on the drum.

It can be noted by the above discussion that document 35' which is held on the rotating drum 10 can be circulated past the read head 3 as many times as it is required or desired. This is another salient feature of the invention since the ability of the flexible document 35' to circulate past the read/record head without any contact and without noticeable wear is a desirable characteristic of the read/write station.

It should be pointed out hereat that the optical light sensor 40 and transducer 41 are shown in FIG. 2 as being oriented near the chamber D. It should be apparent that this arrangement may be judiciously located by those skilled in the art to provide the most advantageous results with respect to the necessary timing for chamber D switching as well as parity checking or other well known computer operations.

After the read/record cycle is completed and the document 35' has left the drum, the station is in a condition to repeat the above-decribed operation.

It should be apparent to those skilled in the art that many variations are possible using the above-described invention. For example, on the upstream side of the head 3 an optional arrangement for the vacuum chamber 5 is to simply vent this chamber to atmosphere. Accordingly, the vents 61 in the slots 62 (see FIG. 4) may be optionally vented to an ambient chamber instead of being connected to a vacuum. Similarly, on the downstream side the chamber 6 may be obviated and reliance may be placed on the vacuum of chamber C to restore the document to the drum.

What is claimed is:

1. A non-contact read/write station comprising:

a. a rotating drum means, said drum having raised rims at its extremities;

b. a flexible member having a magnetic recording surface wherein the length of said member is greater than the circumference of a rotating drum means;

c. means for accurately positioning said member on said drum means such that the members leading and trailing edge overlap;

d. a fixed read-record carcass means including a plurality of read/write heads located outside the periphery of said drum means for executing a read/-write cycle;

e. means for removing said member from said rotating drum and additional means in said carcass for allowing it to be brought near said read/write head, such that the magnetic recording surface is positioned immediately next to said read/write head but without contact;

f. means for returning said member to said rotating drum after said read/write cycle is completed, a bubble configuration being formed in said member in the vicinity of said read/write head.

2. A non-contact read/write station in accordance with claim 1 wherein two stationary chambers are located within said carcass wherein said first chamber is oriented upstream and said second chamber is located downstream of said read/write head, said upstream chamber being connected to a means for relieving a pressure build-up as said bubble is being formed and said downstream chamber being connected to means for assisting said flexible member to return to said drum after said bubble is formed.

3. A non-contact read/write station in accordance with claim 1 wherein a plurality of major stationary chambers are located within said rotating drum means and wherein said major chambers are further subdivided into minor chambers.

4. A non-contact read/write station in accordance with claim 3 wherein said chambers are formed by vanes which are positioned on a stationary hub assembly, said vanes extending up to but not toughing said rotating drum.

5. A non-contact read/write station in accordance with claim 1 wherein said accurate positioning means includes means for causing the document to be skewed at initial contact with said drum to push said member up tight against the edge provided by said rim, said document becoming aligned around said drum after said initial contact.

6. A non-contact read/write station in accordance with claim 1 wherein said carcass includes a plurality of longitudinal slots between successive read/write heads.

7. A non-contact read/write station in accordance with claim 6 wherein respective slots are connected to said upstream chamber via respective connecting means.

8. A non-contact read/write station in accordance with claim 7 wherein there are at least four slots located between adjacent read/write heads.

9. A non-contact read/write station in accordance with claim 2 wherein said upstream chamber is vented to atmosphere.

10. A non-contact read/write station in accordance with claim 2 wherein said upstream chamber is connected to a positive pressure source.

11. A non-contact read/write station in accordance with claim 2 wherein said upstream chamber is connected to a negative pressure source.

12. A non-contact read/write station in accordance with claim 9 wherein said upstream chamber is adjustable by throttling means.

13. A non-contact read/write station in accordance with claim 1 wherein the trailing edge of said document is binary end-coded and the leading edge is straight-edged.

14. A non-contact read/write station in accordance with claim 13 wherein the leading edge is overlapped by said trailing edge such that light can be reflected from the drum through the end-coding and such that contact wear on the leading edge of said document is prevented.

15. A non-contact read/write station in accordance with claim 14 wherein said reflected light activates means for releasing said member from said drum.

16. A non-contact read/write station in accordance with claim 1 wherein the end portions of said drum is chamferred.

17. A non-contact read/write station in accordance with claim 1 wherein one end of said drum is sealed and the other end of said drum is connected to a vacuum source by a flow resistive orifice plate.

18. A non-contact read/write station comprising:

a. a rotating drum means;

b. a document means having a length which is greater than the circumference of said drum means,
  said document being precisely located on said drum means such that the leading and trailing edges overlap;

c. fixed means for recording on and in the alternative, reading information from said document,
  said last mentioned means being located on a circumference greater than the circumference of said drum means;

d. means for removing said document away from said drum and further means for returning it thereto, such that said document is brought near said recording/reading means but without contact thereof,
  a bubble configuration being thereby formed in said document means.

* * * * *

UNITED STATES PATENT OFFICE

CERTIFICATE OF CORRECTION

Patent No. 3,855,621 Dated December 17, 1974

Inventor(s) Richard S. Gluskin et al.

It is certified that error appears in the above-identified patent and that said Letters Patent are hereby corrected as shown below:

In column 10, line 45, "claim 1" should read -- claim 2 --.

Signed and Sealed this

*twenty-second* Day of *July 1975*

[SEAL]

*Attest:*

RUTH C. MASON
*Attesting Officer*

C. MARSHALL DANN
*Commissioner of Patents and Trademarks*